June 23, 1931.  A. J. SMITH  1,811,247
BUBBLE TRAY
Filed May 22, 1930

INVENTOR.
Arthur J. Smith
BY
ATTORNEY.

Patented June 23, 1931

1,811,247

UNITED STATES PATENT OFFICE

ARTHUR J. SMITH, OF KANSAS CITY, MISSOURI, ASSIGNOR TO SMITH ENGINEERING COMPANY, A CORPORATION OF MISSOURI

BUBBLE TRAY

Application filed May 22, 1930. Serial No. 454,701.

This invention relates to improvements in fractionating columns. More particularly it relates to an improved form of bubble tray for use in fractionating columns.

An object of my invention is to construct a bubble tray in which the resistance to the passage of vapors through liquid on the tray is equal throughout the surface of the tray, thereby assuring an even flow of vapors through the liquid and consequently an even and efficient heat interchange between the liquid and vapors in order to produce this desired even resistance to the flow of vapors.

It is a further object of my invention to produce an even and uniform flow by causing the liquid to flow from one to another of a series of progressively descending compartments. In each of these compartments the liquid seeks its level, thereby providing a series of levels rather than progressively descending stream of fluid. In each level the vapors are discharged underneath the liquid which is maintained at a uniform depth.

A further object is to cause separates streams of liquid to flow over equal areas simultaneously and with equal velocity, thus giving a more even and efficient heat interchange between the liquid and vapors.

It is a further object of my invention to provide an adjustable means whereby the vapors may be discharged beneath the liquid at a uniform and predetermined depth.

Figure 1:
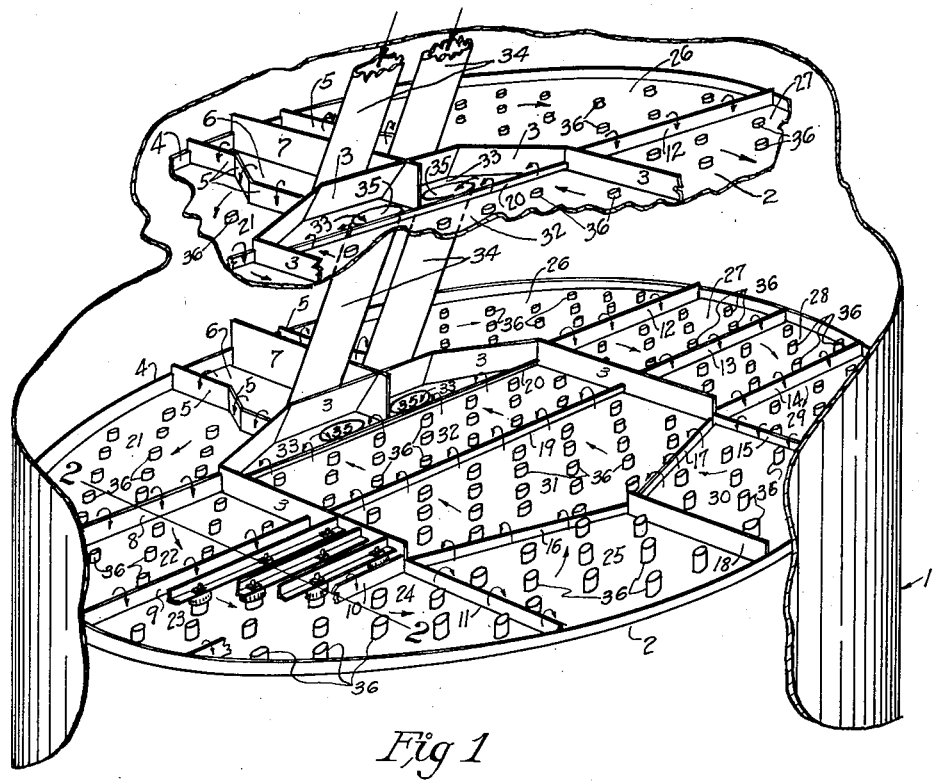
Fig. 1 is an elevation in perspective of a pair of trays.

In the drawings 1 is the shell of a bubble tower in which the bubble tray 2 is located. In practice it will be understood that several trays, similar to the pair of trays shown, may be used and will be superimposed, one above the other in which case the liquid is delivered from the highest tray to the next lower tray and so on through the series of trays.

In the preferred form of my invention shown in Fig. 1, the tray 2 is provided with a series of partitions 3 which form a central compartment with relatively high walls one end of which is left open as shown.

Extending from the partitions 3 of the central compartment to the rim 4 of the tray 2 are a series of partitions 5 which form a well 6; this well may be divided into two sections by a partition 7. Extending between the partitions 3 and the rim 4 are a series of partitions 8, 9, 10 and 11 arranged on one side of the central compartment. On the opposite side of the central compartment a similar set of partitions 12, 13, 14 and 15 are placed, these partitions also progressively decreasing in height. Partitions 16 and 17 extend across the open end of the central compartment and are of less height than the partitions 11 and 15. Partition 18 extends between the juncture of the partitions 16 and 17 and the rim 4. Partitions 19 and 20 are placed across the central compartment, partition 19 being of less height than 16 and 17 and the partition 20 being of less height than the partition 19. With this construction it will be seen that a series of compartments 21, 22, 23, 24 and 25 are provided on one side of the central compartment and a series of compartments 26, 27, 28, 29 and 30 are provided on the opposite side of the central compartment. Both series of compartments on either side of the central compartment gradually decrease in depth due to the decreasing height of the partitions.

The central compartment is divided into compartments 31, 32, and 33 by the partitions 16, 17, 19, and 20. The compartment 32 is shallower than the compartment 31. Liquid is supplied to the well 6 through pipes 34, which in practice receive liquid from the tray above. Liquid supplied to the well 6 in the form of my invention herein shown is delivered thereto by the pipes 34 into two separate compartments formed in the well 6 by the partition 7. The partition 7, however, may be omitted and the liquid supplied thereto by one or more pipes if desired. The liquid in the well 6 when reaching the height of the partitions 5 overflows these partitions into the compartments 21 and 26 and flow progressively with uniform velocity on one side of the central compartment through the compartments 21, 22, 23, 24 and 25 into the compartment 31 in a central compartment and also through the series of compartments 26, 27, 28, 29 and 30 into the compartment 31 within the central compartment. From the compartment 31 within the central compartment the liquid overflows the partitions 19 into the compartment 32 and from the compartment 32 the liquid overflows the partitions 20 into the compartment 33. The compartment 33 is provided with outlets 35 which connect down pipes similar to the pipes 34 which lead to the lower tray and discharge the liquid into a well thereon similar to the well 6. All the compartments are provided with openings through the bottoms thereof for the passage of vapors from the space beneath the tray. Each of these openings is provided with a pipe or chimney 36 which rises above the bottom of the tray to a height which is proportioned to the depth of the compartment wherein the chimneys are situated.

The flow of the liquid on the surface of my tray is indicated by a series of arrows commencing at a point within the well 6 and terminating in the compartment 33 within the central chamber.

Figure 2:
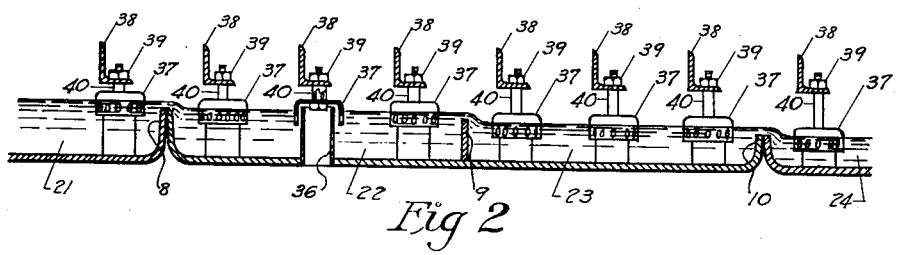
Fig. 2 is the cross section taken on line 2—2 on Fig. 1.

Viewing Fig. 2, it will be seen that the liquid in the series of compartments 21, 22, 23, 24 and 25 therein shown progressively decreases in depth and also the chimneys progressively decrease in depth according to the depth of the liquid in each of the compartments. Each of the chimneys is provided with a bubble cap 37 which is positioned above the top thereof to a depth so that each cap will be submerged to the same depth beneath the liquid in each compartment. To accomplish this each bubble cap is supported from a channel bar 38 by means of a bolt 39 which passes through the bubble cap and extends through a hole in the channel bar and is attached to the channel bar by a nut on the outer end of the bolt. In order to space the bubble cap so that it will assume its correct position with respect to the fluid in each compartment, a spacer 40 is placed between the channel bar 38 and the bubble cap 37 of such a length as will place the buble cap in a position so that it will be submerged in the liquid to an equal amount in each compartment. The channel bars 38, as it will be noted, are mounted on the same level, the adjustment of the bubble caps being by means of bolts 39 and the spacers 40. The position of the chimneys 36 within the trays is such that the free flow through each compartment is the same, thus permitting the flow to proceed with equal velocity through the several compartments. Similar compartments on both sides of the central compartment 31 have the same area. From the construction thus described it will be seen that two streams of fluid proceed simultaneously from the well 6 into two series of compartments which conduct the fluid with equal velocity over equal surfaces of the tray. The amount of fall between each compartment is the same so as to cause a uniform progressive movement of the liquid. The compartment 31 is of a width equal to the combined widths of compartments 25 and 30 which assures there will be no retardation of flow due to a constriction between the compartments 25 and 30 on one hand and the compartment 31 on the other.

The construction of the tray herein disclosed is particularly adapted to fractionating columns wherein it is desired to effect a heat interchange between the hot vapors of a liquid and a liquid body. I have found my tray particularly effective when used in connection with the fractionation of hydrocarbon oils. The uniform velocity of the liquid through the compartments and past the chimneys and bubble caps, produces a uniform heat exchange between the liquid and the vapors passing there through. When my bubble tray is used in connection with the fractionation of petroleum oils, the oil will be progressively stripped of its lighter constituents in a uniform manner and due to the equal resistance to the passage of vapors through the oil, the discharge of vapors through the oil will be equally distributed through the entire area of the tray. This is due to the fact that if the resistance to the passage of vapors were not uniform larger quantities of vapors would escape through those channels which offer the least resistance.

It will be seen that I have provided a construction wherein the bubble caps may be adjusted so that they will be equally submerged in every compartment notwithstanding the difference in depth of the liquid in the various compartments. It is very important, particularly in vacuum distillation that the resistance to passage of vapors through the liquid be quite small and the construction herein shown has been found to be well adapted to such use in that the depth of submergence of bubble caps can be readily adjusted and maintained.

It will also be seen that when using a series of trays as herein described and a liquid such as hydrocarbon oil is delivered from one tray to the other at similar points on each tray, that the oil will flow uniformly over the surface of each tray in the same direction. This causes a composition change in the oil, due to the heat interchange between the oil and vapors to progress uniformly in the same direction on each tray of the series of trays, resulting in a uniform composition difference between the liquid on similar points of the adjacent trays. The temperature difference between the oil on the tray and the vapors coming in contact with it from the tray below is uniform throughout the travel of the liquid on the tray which results in a uniform heat interchange and a uniform composition change from tray to tray. Due to the fact that the oil is caused to pass over the surface of each tray and is subsequently delivered from each tray to the tray beneath at a point which is in line with the point of delivery of the oil to the tray above, it will be seen that the vapors do not come in contact with a liquid of the same composition or temperature more than once, which results in a very efficient heat interchange between the liquids and vapors.

Having described my invention, what I claim is:

1. A device of the class described comprising a tray having a well thereon formed by partitions attached to said tray, a series of compartments formed by partitions attached to said tray extending from said well around one side of said tray and terminating in a central compartment and a second series of compartments extending from said well around the opposite side of said tray and terminating in said central compartment, said well and compartments being so constructed as to cause a liquid to flow progressively and uniformly from said well through said separate series of compartments into said central compartment.

2. A device of the class described comprising a tray having a central compartment thereon formed by partitions attached to said tray; a well formed by partitions attached to said tray and located outside of said central compartment; a circumferential wall around the edge of said tray forming a channel on said tray between said wall and central compartment and a series of partitions of decreasing height extending across said channel and said central compartment forming a series of compartments of decreasing depth progressing from said well through said channel between said wall and central compartment and thence through said central compartment and means to supply said well with liquid and to withdraw liquid from said central compartment at a point in proximity to said well.

3. A device of the class described comprising a tray having a central compartment thereon formed by partitions on said tray; a well formed by partitions on said tray located outside of said central compartment and a circumferential wall around the edge of said tray forming channels on opposite sides of said central compartment between said wall and central compartment; a separate series of partitions of decreasing height extending across said channels and central compartment forming separate series of compartments of decreasing depth progressing from said well on opposite sides of said compartment and terminating in said central compartment and means to supply said well with liquid and to withdraw liquid at a point within said central compartment in proximity to said well.

4. A device of the class described comprising a tray having a well thereon formed by partitions attached thereto, a central compartment on said tray formed by partitions attached thereto, a series of progressively shallower compartments extending from said well around the outside of said central compartment and finally terminating in said separate compartment, a plurality of chimneys extending from openings in said tray to a height adapted to the depth of each of said shallower compartments, a series of bubble caps positioned over the outer ends of said chimneys, an adjustable means for adjusting said bubble caps so as to position them in such a manner as to be equally submerged in the liquid in each of said separate compartments.

5. A device of the class described comprising a tray having a well thereon formed by partitions attached thereto; a central compartment on said tray formed by partitions attached thereto, a separate series of progressively shallower compartments extending on opposite sides of said central compartment and terminating in said central compartment, said central compartment having a series of progressively shallower compartments thereon, means for supplying liquid to said well and withdrawing liquid from said central compartment at a point within the shallowest portion thereof, a plurality of chimneys extending from openings in said tray to a height adapted to the depth of each of said shallower compartments, a series of bubble caps positioned over said chimneys, an adjustable means for adjusting said bubble caps so as to position them in such a manner as to be equally submerged in the liquid in each of said separate compartments.

6. A device of the class described a tray comprising a base, a wall extending around said base and projecting upwardly therefrom, interconnected partitions extending upwardly from said base forming a central compartment having one end thereof open on said base, partitions extending upwardly from said base and extending between said central compartment and said wall forming a well on said base, a series of partitions extending from said wall to the partitions forming said central compartment, forming a series of juxtaposed compartments outside of said central compartment extending from said well to the open end of said central compartment, partitions positioned within said central compartment of decreasing height thereby dividing said central compartment into compartments of decreasing depth, a plurality of openings through the bottom of said compartments, a plurality of chimneys covering said openings and extending upwardly therefrom, a plurality of bubble caps positioned over said chimneys and extending downwardly so as to cover the outer ends of said chimneys means for adjusting said bubble caps so as to be equally submerged in said liquid and means to cause a liquid to flow from said well successively through said compartments and means to remove said liquid from the lowest compartment within said central compartment.

In testimony whereof, I affix my signature.

ARTHUR J. SMITH.